Dec. 28, 1954  C. D. BRANSON  2,698,027
COMBINED STOP AND FLOW CONTROL VALVE UNITS
Filed Jan. 19, 1949
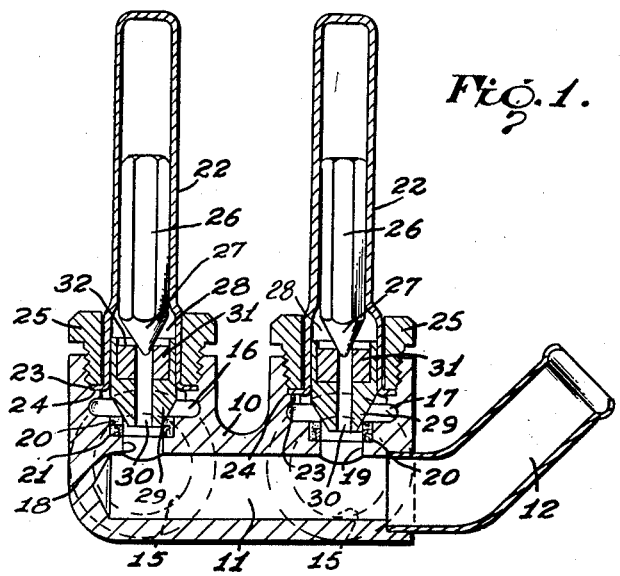
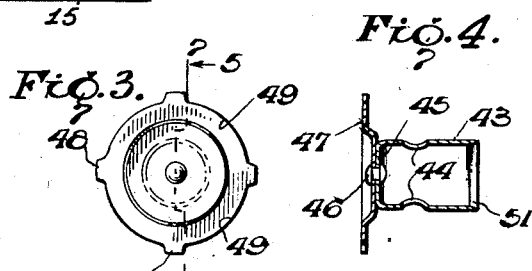
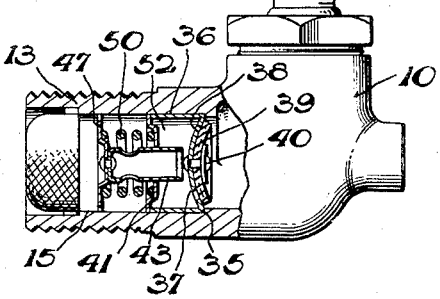
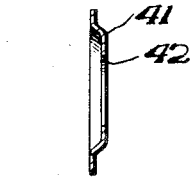
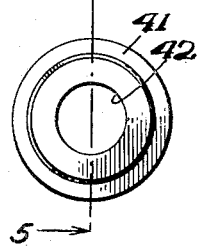
INVENTOR.
Charles D. Branson,
BY
Cameron, Kerkam + Sutton
ATTORNEYS

United States Patent Office 2,698,027
Patented Dec. 28, 1954

2,698,027

COMBINED STOP AND FLOW CONTROL VALVE UNITS

Charles D. Branson, Knoxville, Tenn., assignor to Robertshaw-Fulton Controls Company, Knoxville, Tenn., a corporation of Delaware Application January 19, 1949, Serial No. 71,635

1 Claim. (Cl. 137—504)

This invention relates to combined stop and flow control valves, and more particularly to combined stop and flow control valves constituting a unit for stopping and controlling the flow of liquid derived from a plurality of sources and delivered to a single place of consumption. While embodiments of the invention are susceptible to a variety of uses as will be apparent to those skilled in the art, the invention has particular utility when applied as a valve unit for controlling the flow of either hot water, cold water, or a mixture thereof, to a washing machine, and accordingly will be explained as applied thereto.

Various constructions have heretofore been proposed for controlling the flow of hot and cold water to a washing machine, such constructions usually employing a thermostatically controlled mixing valve for predetermining the temperature of the water to be delivered to the washing machine and sometimes including provisions for by-passing such valve when hot or cold water, rather than a mixture of predetermined temperature, is desired at the washing machine. For some services where sources of hot and cold water of reasonably uniform temperature are available, as in household services, such a thermostatically controlled valve may be an unnecessary refinement, it being sufficient to supply the tub at different times with water at the temperature of the source of cold water, or with water at the temperature of the source of hot water, or with a mixture thereof when water at an intermediate temperature is desired.

It is an object of this invention to provide an improved valve unit which includes provisions for delivering a constant flow of liquid from either or both of the sources thereof.

Another object of this invention is to provide an improved valve unit of the type just characterized wherein a constant flow of hot water or of cold water or of a predetermined mixture of the two may be delivered through a single outlet.

Another object of this invention is to provide an improved valve unit as above characterized which is composed of relatively simple parts that are inexpensive to manufacture and assemble.

Other objects will appear as the description of the invention proceeds.

The invention is capable of receiving a variety of mechanical expressions only one of which has been illustrated or the accompanying drawings, and it is therefore to be expressly understood that the drawings are for purposes of illustration only, and are not to be construed as a definition of the limits of the invention, reference being had to the appended claim for that purpose.

Referring in detail to the accompanying drawings, wherein the same reference characters are used in the several figures to designate corresponding parts, Fig. 1 is a sectional view of an embodiment of the preasent invention;

Fig. 2 is a side elevation of the embodiment of Fig. 1 with a part broken away to show internal construction;

Fig. 3 is a face view to an enlarged scale of the orifice-forming member of a constant flow valve;

Fig. 4 is an axial section, to the scale of Fig. 4, of the orifice-forming member and associated flow control member;

Figs. 5 and 6 are respectively an axial section and a face view, to the same scale as Figs. 3 and 4, of the member for guiding the constant flow control member, Fig. 5 being taken on line 5—5 of Fig. 6.

In conformity with the present invention the valve mechanism to be described is in the form of a unit having a single housing 10, which may be of any suitable size, construction and material, wherein is provided a single outlet passage 11 with which may communicate any suitable conduit 12 for conveying liquid from the housing 10 to the place of consumption, as for example a washing machine.

Housing 10 is also provided with a pair of inlet nipples 13, here shown as threaded for connection with any suitable conduits, as for example conduits leading from a source of cold water and a source of hot water. The passages 15 in said nipples 13, respectively communicate with chambers 16 and 17 separated from the outlet passage 11 by a wall or partition in which are a pair of valve ports, respectively designated 18 and 19, such that when the associated valve members are in open position liquid may flow from either or both of the chambers 17 and 18 into the outlet passage 11. Valve ports 18 and 19 may be provided with valve seats of any suitable construction, each of said ports being here illustrated as provided with an elastic valve seat member 20 having reenforcing means 21 embedded therein as disclosed and claimed in my application Serial No. 28,811, filed May 24, 1948, entitled Valve Seat Members, now abandoned.

Each of the valve ports 18 and 19 is controlled by a solenoid-operated valve member, and as the construction of each of said solenoid-operated valve members is shown as, and preferably is, identical, it will be sufficient to describe one in detail. An elongated tubular casing 22 is flanged at its inner end as shown at 23 and held by a ring nut 25 on a seat 24 suitably formed in the housing 10. Casing 22 constitutes a core on which the coil of the solenoid is wound, and interiorly of the casing 22 is disposed the armature 26 of the solenoid, said armature being of such cross sectional size as to be freely slidable in and guided by the inner wall of the casing 22. Armature 26 is shown as having a generally conical end 27 to form a valve member. Freely slidable in the chamber 28 formed at the inner end of the casing 22 is a second valve member 29, valve member 29 having such clearance with respect to the wall of the casing 22 that said clearance acts as a bleed opening for permitting liquid to flow into the chamber 28. Valve member 29 has an axial passage 30 extending therethrough, and as shown a valve seat member 31, containing an extension of said passage 30, may be seated on a shoulder in valve member 29 and provide a yieldable seat for cooperation with the conical valve portion 27 of the armature 26. Valve member 29 is tapered adjacent its end for cooperation with the valve seat member 20 and its rear face 32 is therefore of larger area than the cross section of said valve member where it engages the valve seat member 20.

When the solenoid coil is energized to lift the armature 26, liquid in the chamber 28 may flow freely therefrom through the passage 30 into the outlet passage 11. An unbalanced pressure is therefore set up on the valve member 29 because its conical face is subjected to the pressure in the chamber 16 while its face 32 is subjected to the lower pressure in the outlet passage through passage 30. Thereby valve member 29 is lifted by said unbalanced pressure and liquid may flow freely from the chamber 16 into the outlet passage 11. When the solenoid is de-energized, however, its valve portion 27 moves to engage the valve seat member 31 and thereby close the outlet from chamber 28 through passage 30. Liquid flowing through the clearance between the valve member 29 and the wall of the casing 22 accumulates in and fills the chamber 28, this liquid being at substantially the same pressure as in chamber 16, and thereby develops an unbalanced pressure on the valve member 29 because the pressure in the chamber 28 on the face 32 of said valve member is greater than the pressure on the under face of said valve member subjected to the lower pressure in the port 18. Valve member 29 is therefore moved downwardly to engage the valve seat member 20 and close the port 18.

As each of the inlet passages 15 has a solenoid-operated valve functioning as just described, energization of either solenoid for respectively actuating the associated valve member to open either the port 18 or the port 19 will result in either cold water or hot water from their respective sources being admitted to the common outlet passage 11 for outflow through the conduit 12, while if both solenoids are energized both of said valve ports are open, and a mixture of hot and cold water is formed in the common outlet passage 11, the temperature of the mixture being determined by the proportion of hot and cold water flowing through the respective ports 18 and 19. As illustrated, said ports are of the same size, but as is apparent such ports may be made of different sizes to vary the proportion of hot or cold water forming the mixture.

In order that the flow of hot water or the flow of cold water or the flow of a mixture of the two shall be constant each of the inlet passages 15 is provided with a constant flow valve. As the constant flow valve in each of the inlet passages 15 may be of the same construction, only one has been illustrated. Referring to the section of Fig. 2, a suitable shoulder 35 is formed on the interior wall of the inlet passage 15, and seated on said shoulder is a cup-shaped member 36 having in its bottom wall 37 a plurality of apertures 38 adjacent the periphery of the bottom wall. As illustrated, a flexible disk 39, formed of any suitable material such as rubber or neoprene, is suitably attached to bottom wall 37 by a pin or rivet 40, said disk 39 being of such size as to close the apertures 38 and constitute therewith a check valve, to prevent reverse flow of the liquid through the inlet passage 15, when back pressure is applied to said disk, but said disk moving away from said apertures when pressure is applied to said disk through said apertures.

Seated on the free end of the cup-shaped member 36 is a disk 41, shown as somewhat dished to center the spring hereinafter referred to, and provided with a central aperture 42. Slidingly mounted in said aperture 42 is a constant flow control member in the form of a tube 43 provided with suitable apertures 44. As shown, said tube 43 is closed at its inner end 45 and suitably secured thereto, as by rivet 46, is an orifice-forming member 47, here shown as in the form of a disk having a suitable number of lugs 48 on its periphery so as to provide guiding contact with the inner face of the inlet passage 15. When installed as shown in Fig. 2, the peripheral portions 49 of the disk 47 between said lugs 48 form arcuate slots with the inner face of the inlet passage 15, said slots together constituting an orifice for flow of liquid from one side to the other of the disk 47. When installed, a coil spring 50 is interposed between the disk 47 and the disk 41, with the tubular valve member 43 passing slidably through the aperture 42 in disk 41.

When so assembled, the inflowing liquid in the inlet passage 15 exerts its pressure on the outer side of the disk 47, tending to move said disk toward the right as viewed in Fig. 2 against the tension of the spring 50. Liquid flowing through the orifice defined by the slots or clearances between the peripheral portions 49 of the disk 47 and the inner face of the inlet passage 15 has a predetermined drop in pressure, depending upon the size of said orifice, under well known hydraulic laws. Said liquid of lower pressure is applied to the inner face of the disk 47 throughout the area of said disk, the apertures 44 being large as compared with the opening through the valve formed by end 51 of tube 43 and the solid portion 37 of cup 36 so that the pressure of the liquid on the inner end 45 of tubular member 43 is substantially the same as that exteriorly of said tubular member. The difference in pressure at the two faces of the disk 47 provides a force which tends to move the disk 47 and its attached flow control member 43 to the right as viewed in Fig. 2. Movement of the free end 51 of the tubular member 43 toward the bottom wall 37 of the cup-shaped member 36 decreases the flow of liquid from the interior of said tubular member 43 to the chamber 52 exteriorly thereof, thus causing the pressure interiorly of tube 43 and on the downstream side of disk 47 to increase and help spring 50 to balance disk 47 against the supply pressure.

Thereby a constant flow of liquid is maintained through the inlet passage 15, notwithstanding any variations of pressure of the liquid entering said inlet passage, by maintaining a constant differential pressure, equal to the tension of the spring 50, across the orifice of known area. If the pressure on the liquid increases so as to tend to increase the rate of outflow, the increased pressure on the outer face of the disk 47 moves the same toward the right as viewed in Fig. 2 to restrict the outflow from member 43 and increase the back pressure on disk 47 until the pressure differential on said disk is equal to the tension of the spring 50. A decrease in the pressure of the liquid entering the inlet passage 15, tending to decrease the rate of outflow of liquid, causes the spring 50 to move the disk 47 and its attached tubular valve member 43 toward the left as viewed in Fig. 2, increasing the spacing between the free end 51 of tubular member 43 and the bottom 37 of the cup-shaped member 36, and thereby increasing the flow of liquid into the chamber 52 and out through the apertures 38. This decreases the pressure on the inner face of disk 47 until the pressure differential on said disk is again equal to the tension of the spring 50.

Therefore, a constant flow of liquid is maintained in each of the inlet passages 15, assuring a constant flow of cold water or of hot water, depending upon which solenoid has been energized. Moreover, when both solenoids are energized a constant flow through both inlet passages 15 assures a constant flow of the mixture of said liquids, the temperature of said mixture being determined by the proportion of hot and cold water being admitted to the outlet passage 11.

It will be understood that the constant flow mechanism of Fig. 2 may be used in the common outlet if desired.

It will therefore be perceived that by the present invention a simple, compact valve unit has been provided whereby flow to a common outlet may be obtained from either a source of cold water or a source of hot water or of a mixture thereof. As the flow is maintained constant in each of the inlet passages or in the outlet passage, the delivery from the valve unit to the place of consumption is at all times at a constant rate of flow. The device is composed of parts which are easy to fabricate and assemble, and at the same time the unit comprises a highly efficient combined stop and constant flow valve mechanism.

While the embodiment of the invention illustrated on the drawings has been described with considerable particularity it is to be expressly understood that the invention is not restricted thereto as the same is capable of receiving a variety of mechanical expressions some of which will now be apparent to those skilled in the art, while changes may be made in the details of construction, arrangement, proportion, size, etc., and parts may be replaced by equivalent parts, without departing from the spirit of this invention. Reference is therefore to be had to the claim hereto appended for a definition of said invention.

What is claimed is:

A constant flow valve mechanism comprising means providing a passage, a disk having at least one aperture adjacent the periphery thereof and mounted in said passage, a tubular member mounted for rectilinear movement and having an inlet to the interior thereof and an open outlet end adjacent the unapertured portion of said disk, a second disk in said last named passage connected to said tubular member and providing an orifice of known area, and a spring cooperating with the first of said disks for biasing said second disk and said tubular member away from said first disk to thereby maintain a predetermined difference in fluid pressures acting on the opposite sides of said second disk.

References Cited in the file of this patent

UNITED STATES PATENTS

| Number | Name | Date |
|---|---|---|
| 2,296,266 | Breckenridge | Sept. 22, 1942 |
| 2,321,573 | Chace | June 15, 1943 |
| 2,453,409 | Chace | Nov. 9, 1948 |
| 2,503,901 | Chace | Apr. 11, 1950 |